United States Patent Office 3,544,299
Patented Dec. 1, 1970

3,544,299
PRODUCTION OF AMMONIUM POLYPHOSPHATE SOLUTIONS AND DIAMMONIUM PHOSPHATE
Charles B. R. Fitz-William, Jr., Richmond, and James E. Sansing, Jr., Chester, Va., assignors to Allied Chemical Corporation, New York, N.Y., a corporation of New York
No Drawing. Filed Sept. 27, 1967, Ser. No. 671,120
Int. Cl. C05b 7/00
U.S. Cl. 71—34                    10 Claims

ABSTRACT OF THE DISCLOSURE

A process for coproducing ammonium polyphosphate fertilizer solution and diammonium phosphate by reacting 25–45% aqueous ammonia with superphosphoric acid containing 70–85% by weight $P_2O_5$ at a temperature within the range of 20–65° C. During the reaction period period of 0.5–6 hours, the pH is maintained in the range of 8.5–9.0 and the reacting mixture is continuously agitated to precipitate out diammonium phosphate. After the diammonium phosphate is separated from the ammonium polyphosphate solution that is formed, superphosphoric acid is added to the solution so as to adjust the pH to 5.7–6.4 and thus stabilize the solution.

BACKGROUND OF THE INVENTION

The present invention relates to the coproduction of ammonium polyphosphate fertilizer solutions and diammonium phosphate and, in particular, to ammonium polyphosphate solutions having a high content of polyphosphate.

The ammonium polyphosphate solutions of the present invention contain a greater percentage of phosphate in the form of polyphosphate than does the starting superphosphoric acid. Since polyphosphate prevents precipitation of metal impurities, the higher polyphosphate content leads to greater storage stability as compared with ordinary ammonium polyphosphate-containing fertilizer solutions.

The diammonium phosphate solid fertilizer obtained by the present process contains more N and $P_2O_5$ than known diammonium phosphate fertilizers prepared from wet-process phospheric acid. This higher plant food content is due in part to the polyphosphate content of the product. Further, the diammonium phosphate of the present invention is readily filterable in the process and is essentially nonhydroscopic in storage. Surprisingly, it is relatively free of metal impurities as compared with product made from wet-process phosphoric acid.

It is one object of the present invention to coproduce ammonium polyphosphate solution and diammonium phosphate.

It is another object of the present invention to produce ammonium polyphosphate fertilizer solutions with a high content of polyphosphate.

It is a further object of the present invention to produce non-hygroscopic diammonium phosphate having a high plant food content.

SUMMARY OF THE INVENTION

In accordance with the present invention, an aqueous solution of ammonium polyphosphate and solid diammonium phosphate are produced by mixing ammonia and superphosphoric acid containing 70–85% $P_2O_5$ such that the pH of the reaction mixture is maintained in the range of 8.5–9.0. The mixture is continually agitated and heated at 20–65° C. for 0.5–6.0 hours to precipitate out diammonium phosphate. The diammonium phosphate precipitate is separated from the solution and superphosphoric acid is added to the ammonium polyphosphate solution so as to adjust the pH to 5.7–6.4 and thus stabilize the solution. All percents are by weight unless specified otherwise.

PREFERRED EMBODIMENT OF THE INVENTION

The raw materials utilized in the process are ammonia or aqueous ammonia and liquid superphosphoric acid derived from "wet-process" phosphoric acid. "Wet-process" phosphoric acid of commerce is manufactured by a process which, in essence, consists of treating phosphate rock (essentially calcium phosphate) with sulfuric acid, whereby there is formed free phosphoric acid and calcium sulfate. The latter, being insoluble, is separated from the acid by filtration. While this process is simple in concept, it is fraught with many technical difficulties and complications, and the resultant phosphoric acid product is a highly impure material, dark in color and containing relatively large amounts of dissolved sulfates and smaller amounts of fluorides, fluosilicates and other salts of aluminum, magnesium, iron and other metals, as well as suspended organic matter.

The term superphosphoric acid as used in this application is defined as phosphoric acid containing substantial quantities of both ortho- and polyphosphoric acids. These polyphosphoric acids include pyrophosphoric acid and other linear polymers. Ordinarily, we prefer to use a superphosphoric acid containing generally about 70–85% and preferably about 70–77% $P_2O_5$ of which at least about 50% and usually 56% is polyphosphoric acids. Superphosphoric acid may be economically prepared by evaporating water from wet-process phosphoric acid.

The ammonia used in the process may be fed as liquid ammonia, gaseous ammonia, ammonium hydroxide solution, or a combination of these materials. An aqueous ammonia solution containing generally about 25–45% and preferably about 30 to 40% ammonia is used in the preferred embodiment of the present invention.

The superphosphoric acid and aqueous ammonia are fed simultaneously into a reaction vessel equipped with a cooling jacket, inlets for the reactants, an agitator, a thermometer, and a pH probe. The reactants may also be admitted into the reaction zone intermittently however the simultaneous addition is preferred. However, whichever method of addition is used, the pH of the reaction mixture must be maintained between 8.5–9.0 during the mixing and preferably between 8.6–8.8. The reactants are constantly agitated during the reaction period which is generally 0.5–6.0 hours and preferably 1.0–3.0 hours. The temperature of the reaction mixture must be kept generally in the range of 20–65° C. to precipitate out most of the diammonium phosphate formed and preferably in the range of 20–45° C. This is accomplished by circulating a suitable coolant through the cooling jacket of the reaction vessel, since the reaction of the superphosphoric acid with the aqueous ammonia is exothermic. The precipitation of the diammonium phosphate is more complete at the lower temperatures. Although it was discovered that the reaction of ammonia and the acid is very rapid, a relatively long reaction time is used to insure substantially complete precipitation of the diammonium phosphate.

In the case where 30–40% aqueous ammonia is used in the reaction, the aqueous ammonia added comprises generally 25–75% and preferably 40–60% of the total amount of superphosphoric acid and aqueous ammonia used. Furthermore, in this case the dried diammonium phosphate product is generally 10–50% and preferably 20–35% of the total amount of superphosphoric acid and aqueous ammonia.

The diammonium phosphate precipitate is separated from the reaction solution by any convenient means and then it is dried preferably by evaporation to the atmosphere at room temperature. The dried solids have about 1–4% water and preferably about 1–2% water and show no tendency towards hygroscopicity.

After the separation of the precipitate, the pH of the reaction solution is adjusted to generally 5.7–6.4 and preferably to 5.9–6.2 by adding superphosphoric acid so as to stabilize the solution. The resulting solution remains clear and stable for many weeks at room temperature, and there is no precipitation even though the solution is cooled to about −20° C.

Ammonium polyphosphate solutions produced by the present process contain a larger percentage of $P_2O_5$ as polyphosphate than is present in the superphosphoric acid from which they are made. Generally, the ammonium polyphosphate solutions contained 10–13% nitrogen and 36–45% $P_2O_5$ wherein 62–75% of the $P_2O_5$ was present as a polyphosphate. Typically, solutions prepared in accordance with the present process contained 10–11% nitrogen and 38–39% total $P_2O_5$, 62–67% of which was polyphosphate. The superphosphoric acid used contained about 71% total $P_2O_5$ with about 56% of this as polyphosphate. The dissolution temperatures for typical ammonium polyphosphate solutions ranged between −26 and −23° C. The viscosities of typical solutions measured in centipoises on a Brookfield viscosimeter averaged 200 at 6° C., 100 at 20° C. and 50 at 40° C.

Generally, diammonium phosphate solid product from the process of the present invention contained 19–23% nitrogen and 50–55% total $P_2O_5$ with 25–35% of the $P_2O_5$ present as polyphosphate. Typical diammonium phosphate product contained 19–21% nitrogen and 50–52% total $P_2O_5$ with 26–33% of this present as polyphosphates. Commercial diammonium phosphate as made from wet-process phosphoric acid analyzes only 18% nitrogen and 46% total $P_2O_5$ with no polyphosphate.

Potassium chloride, ammonium nitrate and urea may be dissolved in the polyphosphate solution, if desired, to form a complete fertilizer, for example, a 14–7–7 grade fertilizer.

The example below illustrates a preferred embodiment of the invention. It is not intended to limit the invention in any way.

EXAMPLE I

The superphosphoric acid contained 71.5% total $P_2O_5$ of which 56% was polyphosphate. The ammoniating liquid was water containing 35% ammonia. These two fluids were fed simultaneously into a stirred pot equipped with cooling jacket, inlets for the reactants, thermometer and pH probe. During the addition, the temperature was maintained at 25 to 35° C. and the pH at about 8.7. After feeding 300 grams of acid to the reactor, the acid stream was stopped and aqueous ammonia continued until the pH was 9.0. A total of 306 grams of aqueous ammonia was used with 1.6 hours time lapse. The reaction slurry was stirred for an additional 0.3 hour during which time the pH dropped to 8.8. The mass was filtered with a fritted glass suction funnel. The filter cake was dried at room temperature. The filtrate at pH 8.8 was treated with additional superacid to reduce the pH to 6.0, in the instant example 46.5 grams superacid/411 grams filtrate. The 457 grams of product solution contained 10.6% N and 38.1% total $P_2O_5$, 67% of which was polyphosphate. The room temperature drying of the filter cake yielded 147 grams of diammonium phosphate containing 20.9% N and 50.0% total $P_2O_5$, of which 26% was polyphosphate. The dried solids had about 2% water and showed no tendency toward hygroscopicity.

Although certain preferred embodiments of the invention have been disclosed for purpose of illustration, it will be evident that various changes and modifications may be made therein without departing from the scope and spirit of the invention.

I claim:
1. A process of coproducing an ammonium polyphosphate solution and solid diammonium phosphate comprising:
   (a) introducing 25–45% aqueous ammonia and superphosphoric acid derived from wet-process phosphoric acid and containing 70–85% by weight $P_2O_5$ into a reaction zone;
   (b) controlling the addition of the ammonia and superphosphoric acid so that the pH of the resulting mixture is in the range of 8.5—9.0;
   (c) agitating the mixture while maintaining the temperature within the range of 20–65° C. so as to precipitate out diammonium phosphate;
   (d) separating the diammonium phosphate that has precipitated from the solution; and
   (e) adding superphosphoric acid to the solution to adjust the pH to 5.7–6.4 so as to stabilize the ammonium polyphosphate solution.

2. The process of claim 1 wherein at least 50% of the total $P_2O_5$ of the superphosphoric acid is present as a polyphosphate.

3. The process of claim 1 wherein 30–40% aqueous ammonia and superphosphoric acid containing 70–77% $P_2O_5$ is introduced into the reaction zone.

4. The process of claim 1 wherein the pH of the mixture is maintained at 8.6–8.8 during the reaction and the mixture is heated within the range of 20–45° C.

5. The process of claim 1 wherein the time of reaction and precipitation of the diammonium phosphate is 0.5–6.0 hours.

6. The process of claim 1 wherein the diammonium phosphate is separated from the mixture by filtration and dried to produce a product containing 19–23% nitrogen and 50–55% total $P_2O_5$ with 25–35% of the $P_2O_5$ present as polyphosphate.

7. The process of claim 1 wherein the ammonium polyphosphate solution product contains 10–13% nitrogen and 36–45% $P_2O_5$ with 62–75% of the $P_2O_5$ present as polyphosphate.

8. The process of claim 3 wherein the superphosphoric acid and aqueous ammonia mixture comprises 25–75% superphosphoric acid and 25–75% aqueous ammonia.

9. The process of claim 3 wherein the diammonium phosphate product is 10–50% of the original superphosphoric acid aqueous ammonia mixture.

10. A process of coproducing an ammonium polyphosphate solution having 10–11% nitrogen and 38–39% $P_2O_5$, of which 62–67% $P_2O_5$ is present as polyphosphate, and diammonium phosphate having 19–21% nitrogen and 50–52% $P_2O_5$, wherein 26–33% of the $P_2O_5$ in the diammonium phosphate is present as polyphosphate comprising:
   (a) introducing 30–40% aqueous ammonia and superphosphoric acid derived from wet-process phosphoric acid and containing 70–77% $P_2O_5$ into a reaction zone;
(b) controlling the addition of the aqueous ammonia and superphosphoric acid so that the pH of the resulting mixture is in the range 8.6–8.8;
(c) agitating the mixture while maintaining the temperature within the range of 20–45° C. so as to precipitate out diammonium phosphate in 1.0–3.0 hours;
(d) separating the diammonium phosphate that has precipitated from the solution; and
(e) adding superphosphoric acid to the solution to adjust the pH to 5.9–6.2 so as to stabilize the ammonium polyphosphate solution.

References Cited

UNITED STATES PATENTS

| | | | |
|---|---|---|---|
| 3,019,099 | 1/1962 | Walters | 71—34 |
| 3,323,863 | 6/1967 | Seymon | 71—43 |
| 3,342,579 | 9/1967 | Frazier | 23—107 |
| 3,399,032 | 8/1968 | Young | 71—43 |

REUBEN FRIEDMAN, Primary Examiner

C. N. HART, Assistant Examiner

U.S. Cl. X.R.

71—43